(12) United States Patent
Schuller-Rach et al.

(10) Patent No.: US 11,925,142 B2
(45) Date of Patent: Mar. 12, 2024

(54) ELECTRIC MOTOR AND BLADE ASSEMBLY FOR A LAWN MOWER

(71) Applicant: Ariens Company, Brillion, WI (US)

(72) Inventors: Matthew P. Schuller-Rach, Kaukauna, WI (US); Joshua R. Wilson, Random Lake, WI (US); Michael J. Holeton, Kaukauna, WI (US); Brent P. Berglund, Brillion, WI (US)

(73) Assignee: Ariens Company, Brillion, WI (US)

( * ) Notice: Subject to any disclaimer, the term of this patent is extended or adjusted under 35 U.S.C. 154(b) by 35 days.

(21) Appl. No.: 17/767,830

(22) PCT Filed: Sep. 18, 2020

(86) PCT No.: PCT/US2020/051385
§ 371 (c)(1),
(2) Date: Apr. 8, 2022

(87) PCT Pub. No.: WO2021/071652
PCT Pub. Date: Apr. 15, 2021

(65) Prior Publication Data
US 2023/0231436 A1 Jul. 20, 2023

Related U.S. Application Data

(60) Provisional application No. 62/914,115, filed on Oct. 11, 2019.

(51) Int. Cl.
*A01D 34/73* (2006.01)
*A01D 34/78* (2006.01)
(Continued)

(52) U.S. Cl.
CPC .......... *A01D 34/78* (2013.01); *A01D 34/733* (2013.01); *A01D 69/02* (2013.01); *F16C 19/06* (2013.01);
(Continued)

(58) Field of Classification Search
CPC ...... A01D 34/733; A01D 34/78; A01D 69/02; A01D 75/18; F16C 2310/00; H02K 5/1735; H02K 7/085; H02K 21/22
See application file for complete search history.

(56) References Cited

U.S. PATENT DOCUMENTS 2,978,858 A  4/1961 Moody
3,034,275 A * 5/1962 Happe .................... A01D 34/84
                                                          37/189
(Continued)

FOREIGN PATENT DOCUMENTS

CN      1449092 A      10/2003
CN    104079103 A      10/2014
(Continued)

OTHER PUBLICATIONS

International Search Report with Written Opinion for related Application No. PCT/US2020/051385 dated Nov. 24, 2020 (16 Pages).
(Continued)

*Primary Examiner* — Alicia Torres
(74) *Attorney, Agent, or Firm* — Michael Best & Friedrich LLP

(57) ABSTRACT

A configuration of a direct drive lawnmower spindle assembly to protect sensitive electric motor components is provided. A spindle shaft of the spindle assembly is supported by upper and lower bearings. An upper end of the spindle shaft is mounted to a rotor of the electric motor and a lower end of the spindle shaft extends through the clearance opening. The lower bearing is supported by a lower bearing carrier that is mounted to the bottom of the spindle housing. The lower bearing can be serviced by removing the lower bearing carrier. A clearance gap between the spindle shaft and the clearance opening is sufficiently small to limit spindle shaft tipping to a degree that will not damage the (Continued)

motor. The invention also provides a friction coupling system for coupling a blade with the rotating spindle shaft.

21 Claims, 10 Drawing Sheets

(51) Int. Cl.
*A01D 69/02* (2006.01)
*F16C 19/06* (2006.01)
*H02K 5/173* (2006.01)
*H02K 7/08* (2006.01)
*H02K 21/22* (2006.01)
*A01D 34/66* (2006.01)
*A01D 101/00* (2006.01)

(52) U.S. Cl.
CPC ........... *H02K 5/1735* (2013.01); *H02K 7/085* (2013.01); *H02K 21/22* (2013.01); *A01D 34/66* (2013.01); *A01D 2101/00* (2013.01); *F16C 2310/00* (2013.01)

(56) References Cited

U.S. PATENT DOCUMENTS

| | | | |
|---|---|---|---|
| 3,221,481 A * | 12/1965 | Mattson | A01D 34/84 56/16.9 |
| 3,788,050 A | 1/1974 | Houst et al. | |
| 4,084,397 A | 4/1978 | McGrath | |
| 5,117,617 A | 6/1992 | Scag | |
| 5,615,540 A | 4/1997 | Yang | |
| 5,782,073 A | 7/1998 | Sheldon | |
| 5,960,617 A | 10/1999 | Sheldon | |
| 6,286,293 B1 | 9/2001 | Scag et al. | |
| 6,470,663 B2 | 10/2002 | Langworthy et al. | |
| 6,688,090 B2 | 2/2004 | Velke et al. | |
| 7,200,982 B2 | 4/2007 | Vandyke | |
| 7,861,503 B1 | 1/2011 | Campbell | |
| 8,227,948 B1 | 7/2012 | Fox et al. | |
| 8,240,414 B2 | 8/2012 | Sasahara et al. | |
| 8,575,800 B1 | 11/2013 | Fox et al. | |
| 8,657,041 B2 | 2/2014 | Ishii et al. | |
| 8,668,043 B2 | 3/2014 | Yang et al. | |
| 8,966,870 B2 | 3/2015 | Mackinnon et al. | |
| 9,210,839 B2 | 12/2015 | Schygge et al. | |
| 9,282,695 B2 | 3/2016 | Goto | |
| 9,380,741 B2 | 7/2016 | Drew et al. | |
| 9,398,743 B1 | 7/2016 | Fox et al. | |
| 9,840,143 B1 | 12/2017 | Keller et al. | |
| 9,950,621 B2 | 4/2018 | Dwyer | |
| 9,980,434 B1 | 5/2018 | Brown | |
| 10,091,936 B2 | 10/2018 | Aurin et al. | |
| 10,093,169 B1 | 10/2018 | Keller et al. | |
| 10,149,433 B2 | 12/2018 | Wyne | |
| 10,292,326 B2 | 5/2019 | Tanabe et al. | |
| 11,462,967 B2 | 10/2022 | Kouda et al. | |
| 11,646,629 B2 | 5/2023 | Kouda et al. | |
| 11,712,001 B2 | 8/2023 | Zeiler et al. | |
| 2005/0005588 A1 | 1/2005 | Jager | |
| 2005/0230168 A1 | 10/2005 | Fillman et al. | |
| 2012/0260617 A1 | 10/2012 | Gilpatrick | |
| 2014/0165524 A1 | 6/2014 | Schygge et al. | |
| 2015/0006025 A1 | 1/2015 | Rhoades et al. | |
| 2015/0359170 A1 | 12/2015 | Ito et al. | |
| 2016/0183451 A1 | 6/2016 | Conrad et al. | |
| 2018/0146620 A1 | 5/2018 | Uchimi et al. | |
| 2018/0192580 A1 | 7/2018 | Zeiler et al. | |
| 2018/0235149 A1 | 8/2018 | Ito et al. | |
| 2018/0249630 A1 | 9/2018 | Mullet et al. | |
| 2018/0310471 A1 | 11/2018 | Pellenc | |
| 2019/0069480 A1 | 3/2019 | Ladd, Jr. et al. | |
| 2020/0112227 A1 | 4/2020 | Kouda et al. | |
| 2021/0105939 A1 | 4/2021 | Zeiler et al. | |

FOREIGN PATENT DOCUMENTS

| | | | | |
|---|---|---|---|---|
| DE | 29711472 U1 * | 10/1997 | ......... | A01D 34/6806 |
| JP | 2005237265 A | 9/2005 | | |
| JP | 2009296936 A | 12/2009 | | |
| JP | 05027461 B2 | 9/2012 | | |
| JP | 2020124081 A | 8/2020 | | |
| WO | 2017109319 A1 | 6/2017 | | |
| WO | 2017222368 A1 | 12/2017 | | |

OTHER PUBLICATIONS

International Preliminary Report on Patentability for related Application No. PCT/US2020/051385 dated Apr. 12, 2022 (8 Pages).
Chinese Patent Office Action for Application No. 202080083471.7 dated Aug. 26, 2023 (18 pages including English translation).
AMP by Ariens™, "Rider," Parts Manual @ 2009 (26 pages).

* cited by examiner

ELECTRIC MOTOR AND BLADE ASSEMBLY FOR A LAWN MOWER

FIELD OF THE INVENTION

The present invention relates to an electric motor and blade assembly for a lawn mower.

BACKGROUND

A spindle assembly for a lawn mower often includes a spindle shaft having upper and lower bearings to maintain a spindle shaft in alignment. A blade is mounted to a bottom end of the spindle shaft and rotates with the spindle shaft to cut grass. The lower bearing often wears out before the upper bearing and needs to be repaired or replaced (collectively "serviced"). Servicing the lower bearing often leads to tilting or other movement of the spindle shaft from its operational position. Because traditional spindle assemblies are connected to the prime mover through belts or other types of transmission, there is often enough "give" in the system to accommodate the spindle shaft tilting associated with servicing the lower bearing without any concern about damaging other components of the mower.

During operation of a lawn mower, a cutting blade driven by a prime mover (e.g., an internal combustion engine) may experience a blade impact event (e.g., the cutting blade may strike a natural or man-made object such as a rock, tree root, stake, etc.). The blade impact event results in an impact force on the cutting blade. In known lawn mowers, rotary power is supplied to the cutting blade from the prime mover through a force transmission element such as a belt. In such known lawn mowers, the force transmission element may absorb the impact force on the blade either through an elastic property of the force transmission element resilience of its material such as rubber) or through the force transmission slipping (e.g., a belt slipping on a sheave) or both.

SUMMARY

In one embodiment, the invention provides an electric motor for a lawn mower including a spindle housing having a bore with a spindle clearance opening. An upper housing coupled to an upper portion of the spindle housing. A stator positioned within the upper housing. A spindle shaft extending vertically through the bore of the spindle housing. The spindle shaft having an upper spindle shaft portion and a lower spindle shaft portion. A rotor coupled to the stator within the upper housing and coupled to the spindle shaft for rotation of the spindle shaft. An upper bearing supporting the upper spindle shaft portion in the rotor. A lower bearing supporting the lower spindle shaft portion. A lower bearing carrier mounted to the spindle housing and supporting the lower bearing proximate to the spindle clearance opening. A blade adapter coupled to the lower spindle shaft portion. A bearing debris guard coupled to the spindle housing around the lower bearing, the lower bearing carrier, and a portion of the blade adapter to protect the lower bearing from debris. A blade coupled to the blade adapter with a blade mounting fastener.

In some embodiments, the invention further comprises a washer having outer edges embedded within a lower portion of the debris guard. In some embodiments, the washer is formed of a metallic material with the central exposed portion providing a bearing surface in frictional engagement the blade. In some embodiments, a bearing surface is formed by the debris guard or the blade adapter, wherein the blade is configured to slip relative to the spindle shaft and the bearing surface when a blade impact event occurs. In some embodiments, the blade adapter includes a stand-off portion that extends through the bearing debris guard, wherein a gap extends between the mounting fastener and the bearing surface. In some embodiments, the invention further comprises a biasing member positioned in the gap and deflected by the blade mounting fastener when the gap is narrowed, wherein the biasing member generates a blade coupling force on the blade. In some embodiments, the blade coupling force generates a blade coupling friction between the blade and the bearing surface to frictionally couple the blade and the spindle shaft for rotation together. In some embodiments, the blade slips with respect to the spindle shaft in response to the blade encountering a force resisting rotation of the blade to an extent that overcomes the blade coupling friction.

In another embodiment, the invention provides a method of assembling and servicing an electric motor having a spindle housing defining a bore with a spindle clearance opening and an upper housing coupled to an upper portion of the spindle housing. The method includes positioning a stator in the upper housing. Coupling a rotor to the stator within the upper housing. Positioning a spindle shaft within the bore. The spindle shaft extending vertically through the bore of the spindle housing. The spindle shaft having an upper spindle shaft portion and a lower spindle shaft portion. Supporting the upper spindle shaft portion in the rotor with an upper bearing. Supporting the lower spindle shaft portion with a lower bearing. Supporting the lower bearing proximate to the spindle clearance opening with a lower bearing carrier mounted to the spindle housing. Coupling a blade adapter to the lower spindle shaft portion. Coupling a bearing debris guard to the spindle housing around the lower bearing, the lower bearing carrier, and a portion of the blade adapter to protect the lower bearing from debris. Coupling a blade to the blade adapter with a blade mounting fastener.

In some embodiments, the invention further comprises restricting the motion of the spindle shaft with the spindle clearance opening when the lower bearing, the lower bearing carrier, the blade adapter, the bearing debris guard, and the blade are removed from the electric motor. In some embodiments, the invention further comprises replacing the lower bearing with a replacement lower bearing and coupling the replacement lower bearing, the lower bearing carrier, the blade adapter, the bearing debris guard, and the blade to the electric motor. In some embodiments, the invention further comprises uncoupling the blade mounting fastener to remove the blade from the blade adapter. In some embodiments, the invention further comprises uncoupling the bearing debris guard from the spindle housing to allow access to the lower bearing, the lower bearing carrier, and the blade adapter. In some embodiments, the invention further comprises uncoupling the blade adapter from the lower spindle shaft portion. In some embodiments, the invention further comprises unmounting the lower bearing carrier from the spindle housing to remove the lower bearing carrier and the lower bearing from the electric motor. In some embodiments, the invention further comprises restricting the motion of the spindle shaft with the spindle clearance opening. In some embodiments, the invention further comprises providing a replacement lower bearing in the lower bearing carrier. In some embodiments, the invention further comprises mounting the lower bearing carrier to the spindle housing so the replacement lower hearing supports the lower spindle shaft portion. In some embodiments, the invention further comprises coupling the blade adapter, debris guard, and the blade to the electric motor.

In another embodiment, the invention provides an electric motor for a lawn mower including a spindle housing having a bore with a spindle clearance opening. An upper housing coupled to an upper portion of the spindle housing. A stator positioned within the upper housing. A spindle shaft extending vertically through the bore of the spindle housing. The spindle shaft having an upper spindle shaft portion and a lower spindle shaft portion. A rotor coupled to the stator within the upper housing and coupled to the spindle shaft for rotation of the spindle shaft. An upper bearing supporting the upper spindle shaft portion in the rotor. A lower bearing supporting the lower spindle shaft portion. A lower bearing carrier mounted to the spindle housing and supporting the lower bearing proximate to the spindle clearance opening. A blade adapter coupled to the lower spindle shaft portion. A bearing debris guard coupled to the spindle housing around the lower bearing, the lower bearing carrier, and a portion of the blade adapter to protect the lower bearing from debris. A blade coupled to the blade adapter with a blade mounting fastener. The blade, the bearing debris guard, the blade adapter, the lower bearing carrier, and the lower bearing are removable from the electric motor. The spindle clearance opening limits the radial movement of the lower portion of the spindle shaft when the blade, the bearing debris guard, the blade adapter, the lower bearing carrier, and the lower bearing are removed from the electric motor.

In another embodiment, the invention provides an assembly for mounting a blade to a spindle. The assembly includes a first bearing surface on one side of the blade and frictionally engaging the blade. The first bearing surface rigidly coupled for rotation with the spindle. A second bearing surface on an opposite side of the blade. A biasing mechanism in a gap between the second bearing surface and the blade. A fastener operable to move the second bearing surface toward the blade to narrow the gap and deflect the biasing mechanism. A gap setting component preventing the fastener from narrowing the gap beyond a preferred gap size. The biasing mechanism generates a blade coupling force in response to the gap achieving the preferred gap size. The blade coupling force generates a blade coupling friction between the blade and the first bearing surface to frictionally couple the blade and the spindle for rotation together. The blade slips with respect to the spindle in response to the blade encountering a force resisting rotation of the blade to an extent that overcomes the blade coupling friction.

Other aspects of the invention will become apparent by consideration of the detailed description and accompanying drawings.

DETAILED DESCRIPTION

Figure 1:
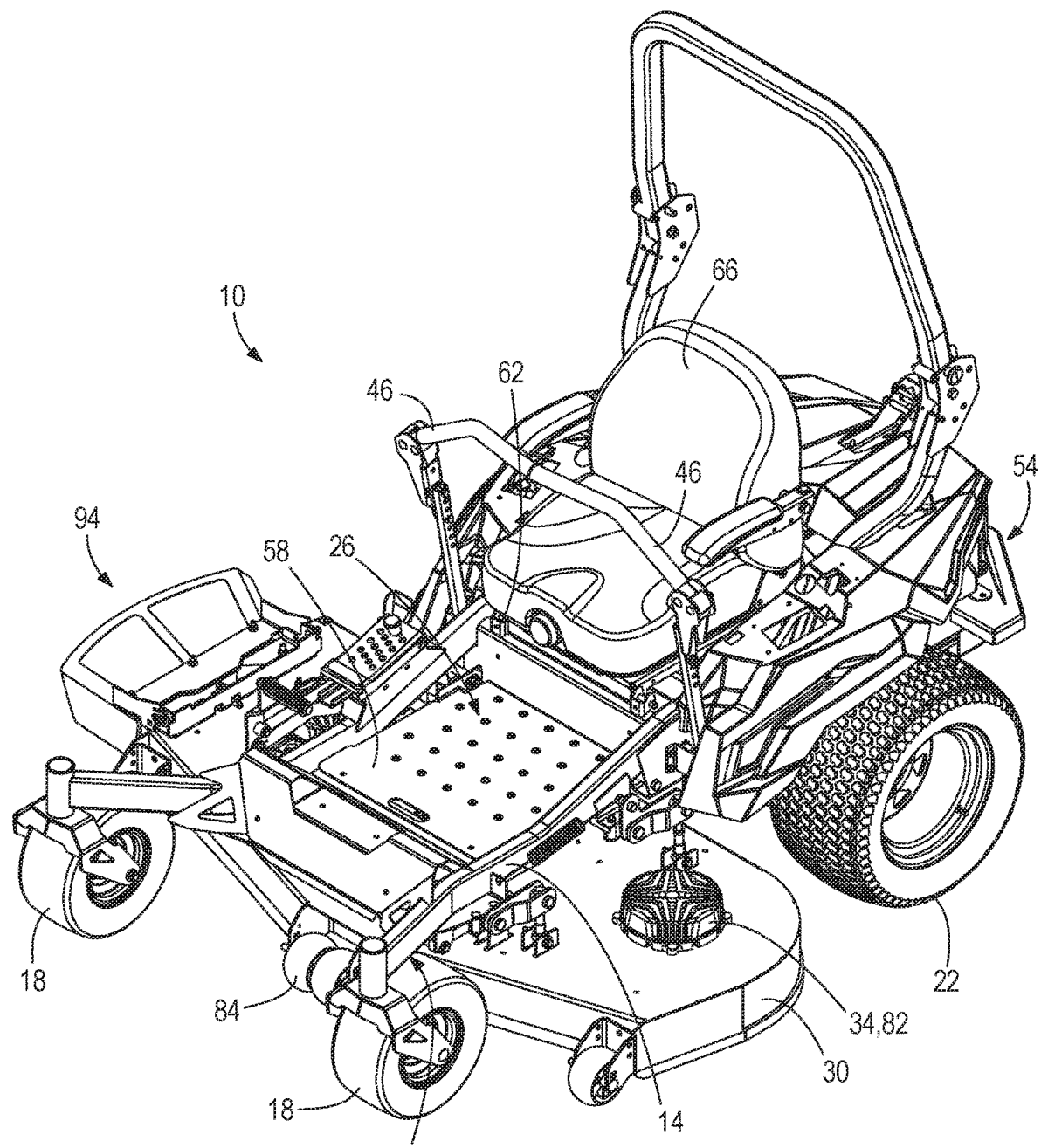
FIG. 1 is a perspective view of an electric zero turn lawn mower according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. As used herein, terms relating to position (e.g., front, rear, left, right, etc.) are relative to an operator situated on a utility vehicle during normal operation of the utility vehicle.

One problem addressed with the present invention arises from the nature of a cutting deck spindle assembly that includes a dedicated, direct-drive electric deck motor. Such an assembly includes, among other elements as will be explained below, the deck spindle, the electric deck motor, an upper spindle bearing, and a lower spindle bearing. Such assembly gives rise to unique problems relating to the direct-drive nature of the assembly and the sensitivity of the electrical components (e.g., the rotor and stator) of the electric deck motor.

Due to the direct-drive nature of the assembly (i.e., the electric deck motor is directly coupled to the spindle), there is no force transmission element such as a belt to absorb the impact force on the cutting blade during a blade impact event. The impact force follows a relatively rigid load path from the blade, through the spindle, and to the electric deck motor with very little or no "give" in the load path. Therefore, the components of such cutting deck spindle assembly may be damaged from a single impact force or repeated impact forces.

Another problem addressed with the present invention is the difficulty of replacing the lower spindle bearing of a deck spindle assembly that includes a dedicated, direct-drive electric deck motor. The lower bearing of a deck spindle assembly tends to wear out faster than the rest of the assembly. As a result, the lower bearing can be serviced from time-to-time to extend the life of the overall spindle assembly. This poses no significant problems for a known spindle assembly that is driven through a force transmission element. But because of the direct-drive nature of a deck spindle assembly that includes a dedicated, direct-drive electric deck motor, any significant off-axis displacement (e.g., tipping or radial movement) of the spindle while the lower bearing is being serviced could damage the sensitive electrical components of the electric deck motor (e.g., the stator or rotor) Consequently, great care needs to be taken when replacing the lower spindle bearing to limit off-axis displacement of the spindle within an acceptable range that will avoid damage to the electric deck motor.

FIGS. 1-4 illustrate a lawn mower 10. The lawn mower 10 may be, for example, an electric lawn mower, an internal combustion lawn mower, or a hybrid lawn mower. The illustrated lawn mower 10 includes a frame 14, a plurality of rotatable wheels or ground-engaging elements 18, 22 coupled to the frame 14, an operator platform 26 supported by the frame 14, a cutting deck 30 coupled to the frame 14. The lawn mower 10 includes a prime mover (e.g., an internal combustion engine, one or more electric motors, etc.). In the illustrated embodiment, the prime mover includes a plurality of prime movers in the form of dedicated drive motors 42 (FIG. 3) and deck motors 34.

The drive motors 42 are supported by the frame 14, with each coupled to one of the rear ground-engaging elements 22 to independently drive rotation of the associated rear ground-engaging element 22 at a selected speed and direction. In this regard, the rear ground-engaging elements 22 may also be referred to as the "drive wheels." In the illustrated embodiment, the front ground-engaging elements 18 are passive caster wheels. In other embodiments, similar drive motors may also or alternatively be coupled to the front ground-engaging elements 18 for the same purpose as the drive motors 42. The deck motors 34 are mounted to the cutting deck 30 and are part of the spindle assemblies as will be discussed in more detail below. Because of the direct connection between the deck motors 34 and the spindle assemblies, the deck motors 34 can be referred to as direct drive motors. The drive and deck motors 42, 34 are powered by a power source (FIG. 4) which, in the illustrated embodiment, is a bank (plurality) of batteries 38 (also called battery packs). In some embodiments, a single battery may be used as the power source. The batteries 38 are electrically coupled to the drive motors 42 and deck motors 34 to provide enough power for their operation.

Figure 2:
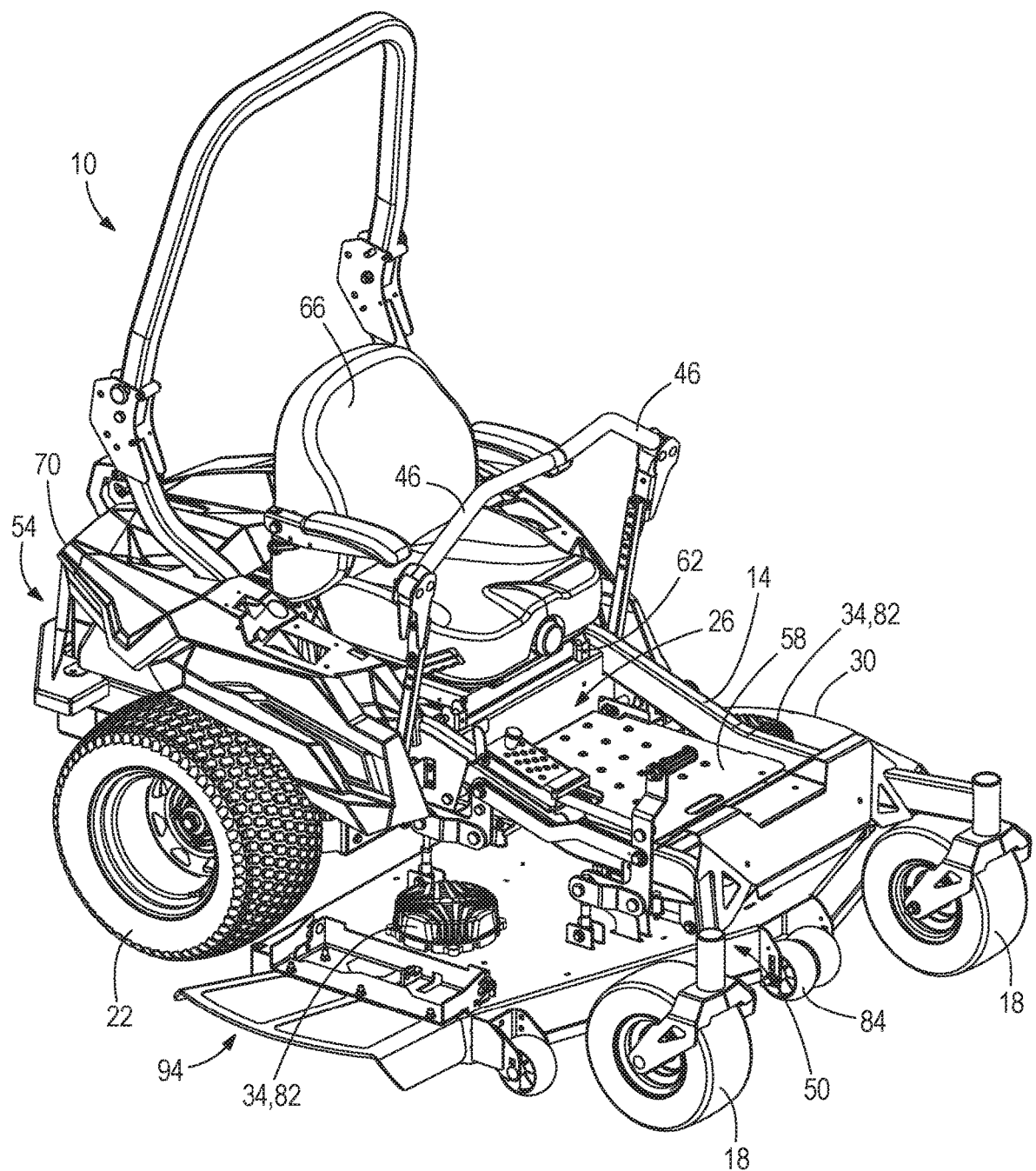
FIG. 2 is another perspective view of the lawn mower of FIG. 1.

With reference to FIGS. 1 and 2, the illustrated lawn mower 10 includes operator controls 46. The operator controls 46 are coupled to the frame 14 adjacent the operator platform 26. The operator controls 46 are operable to control the lawn mower 10. For example, the operator controls 46 can be used to control the drive motors 42 to drive a desired speed and direction of rotation of the rear ground-engaging elements 22 to move and/or turn the lawn mower 10. In the illustrated embodiment, the operator controls 46 include two handles used for a zero-turn radius (ZTR) lawn mower. In other embodiments, the operator controls 46 may include other suitable actuators, such as a steering wheel, joystick(s), and the like. In some embodiments, a control panel (e.g., a display, ignition, etc.) may be supported by the frame 14 to selectively control the activation and operation of the deck motors 34 and the drive motors 42.

The frame 14 includes a first or front portion 50 (extending to the center of the frame 14) and a second or rear portion 54 (meeting the front portion 50 at the center of the frame 14) opposite the front portion 50. The frame 14 defines the basic body structure or chassis of the lawn mower 10 and supports the other components of the lawn mower 10. The cutting deck 30 is supported underneath the frame 14 mainly in the front portion 50 in the illustrated embodiment, but in other embodiments might be moved rearward to the center or even fully to the rear portion 54, for example. The batteries 38 are illustrated as being supported in the rear portion 54, but in other embodiments may be supported on the front portion 50 or in the center between the front and rear portions 50, 54 of the frame 14.

The ground-engaging elements 18, 22 are movably (e.g., rotatably) coupled to the frame 14. The illustrated ground-engaging elements 18, 22 include two first ground-engaging elements 18 coupled to the front portion 50 of the frame 14, and two second ground-engaging elements 22 coupled to the rear portion 54 of the frame 14. In the illustrated embodiment, the ground-engaging elements 18, 22 are wheels but in other embodiments could be tracks for example. The first ground-engaging elements 18 are idle wheels that are not driven by the prime mover, while the second ground-engaging elements 22 are driven wheels that are operatively coupled to the prime mover. In other embodiments, the first ground-engaging elements 18 may also or alternatively be driven wheels that are operatively coupled to the prime mover.

The operator platform 26 is supported by the frame 14 and located in the middle of the frame 14 (partially on the front portion 50 and partially on the rear portion 54). The illustrated operator platform 26 includes a first or lower section 58 and a second or upper section 62. The lower section 58 is located forward of the upper section 62 and configured to support a user's feet. The upper section 62 is located rearward of the lower section 58 and supports a seat 66. The seat 66 allows a user to sit during operation of the lawn mower 10 and access the operator controls 46. In some embodiments, the operator platform 26 may only include the lower section 58 such that the lawn mower 10 is a standing vehicle. In such configurations, the operator platform for the standing using may be at the rear of the mower. In further embodiments, the operator platform 26 may have other configurations. An operator zone is defined as the seat 66 and all controls and other elements of the lawn mower 10 that can be reached by the user while seated 66, such as the operator controls 46, a portion of the operator platform 26 that support the user's feet, and any foot-actuated brakes or controls in reach of the user while the user is in the seat 66.

Figure 4:
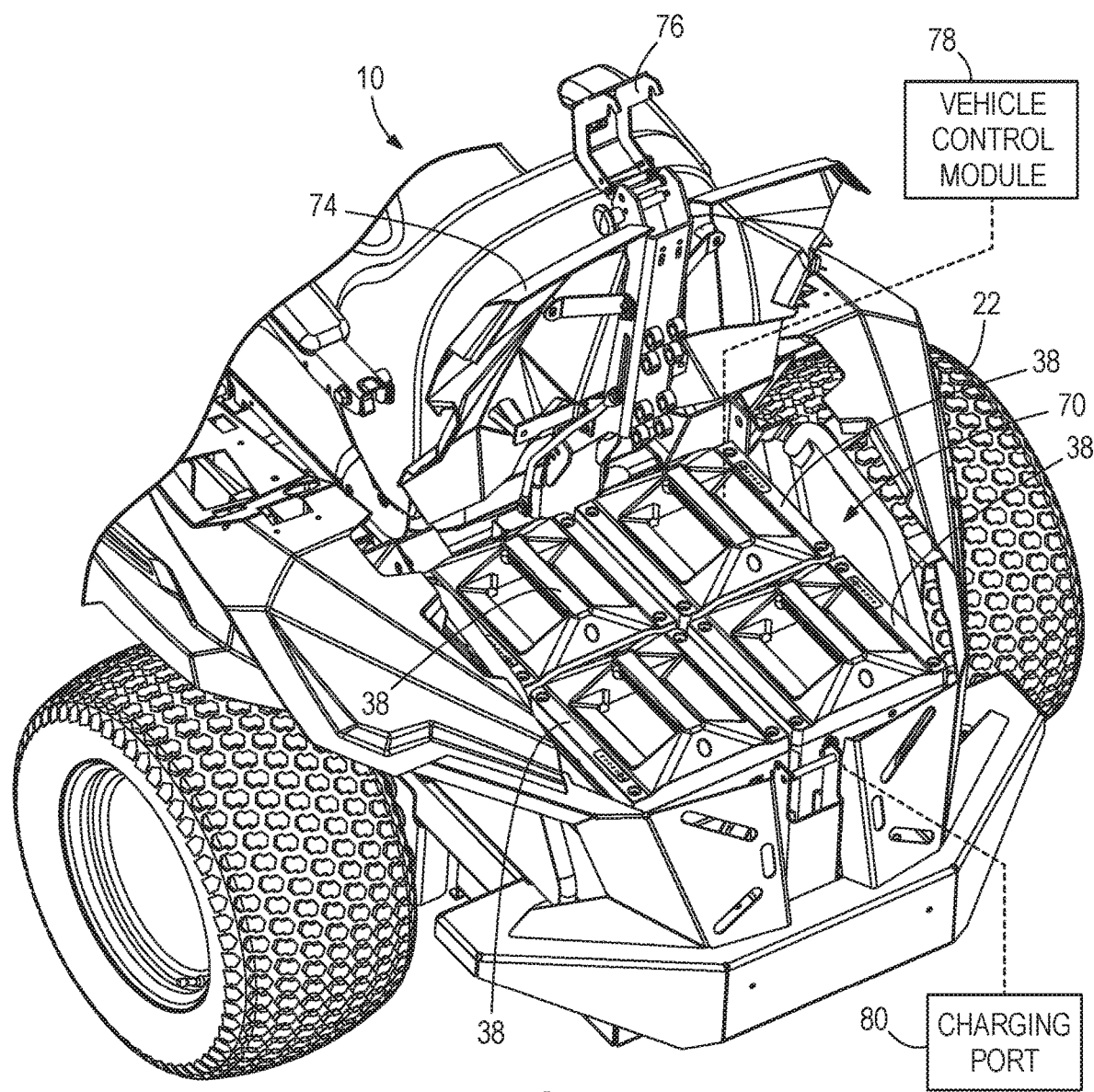
FIG. 4 is a perspective view of a battery compartment of the lawn mower.

With reference to FIG. 4, the batteries 38 are positioned in a battery compartment 70 supported by the frame 14. A lid 74 is pivotally coupled to the battery compartment 70. The lid 74 includes a latch 76 that selectively secures the lid 74 to the battery compartment 70 in a closed condition in with the batteries 38 are fully enclosed within the battery compartment 70 and covered by the lid 74. The batteries 38 are coupled to a bus bar (not shown) that operably (i.e., electrically) couples the batteries 38 to the deck motor(s) 34 and the drive motor(s) 42 through a vehicle control module 78 (illustrated schematically). The mower 10 may include one or more charging ports 80 (illustrated schematically) to charge the batteries 38, while the batteries 38 are positioned within the battery compartment 70. Additionally, the batteries 38 may be removed from the battery compartment 70, when the lid 74 is in an open condition (e.g., as shown in FIG. 4) to charge the batteries 38 on an external charger. In other embodiments, the batteries 38 may be positioned in an alternative position within the mower 10. Additionally, or alternatively, an internal combustion engine may be used as the prime mover of the lawn mower 10 and the batteries 38 may be used only for the deck motors 34.

Figure 3:
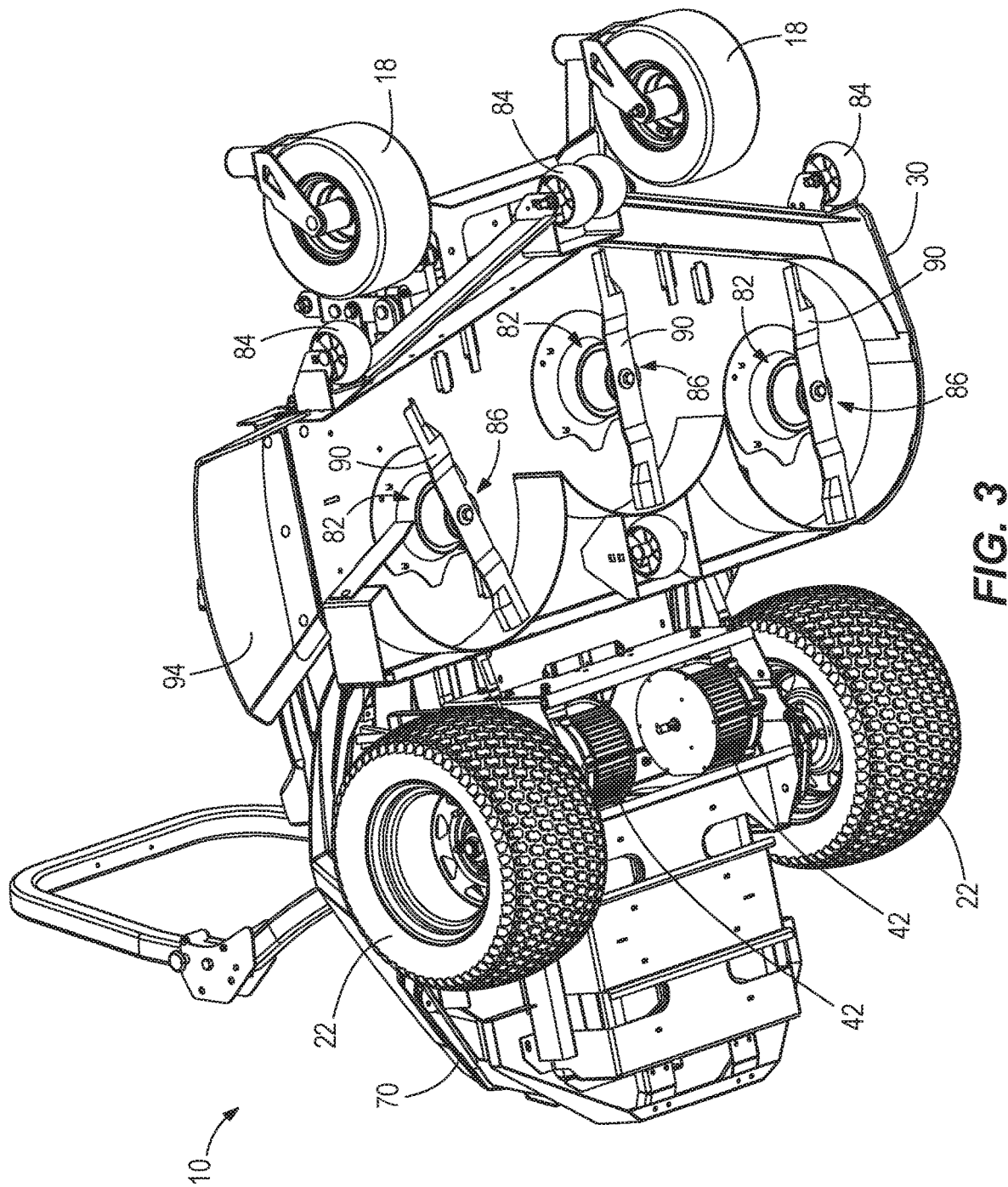
FIG. 3 is a bottom perspective view of the lawn mower.
Figure 5:
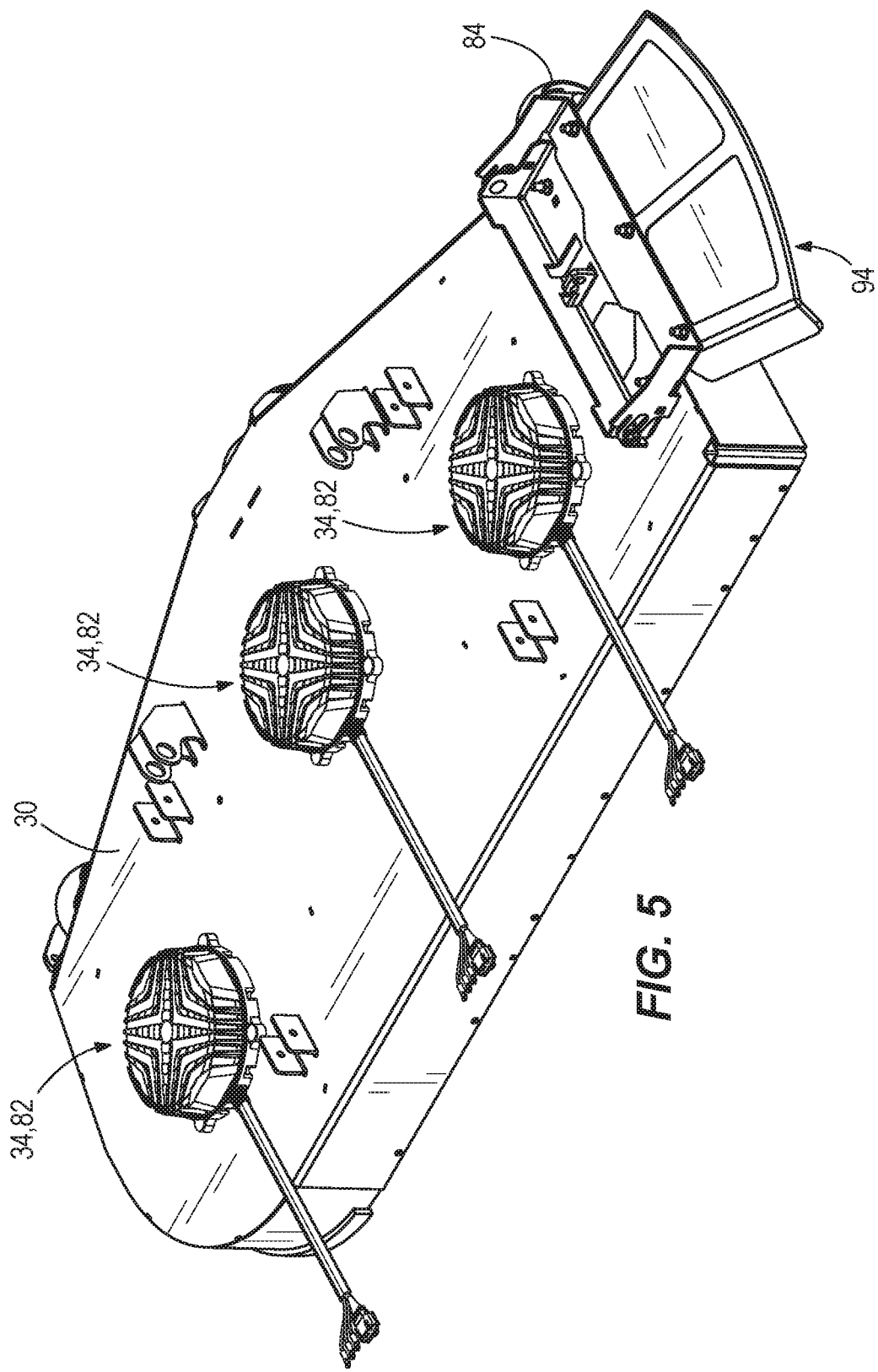
FIG. 5 is a perspective view of a cutting deck of the lawn mower.
Figure 6:
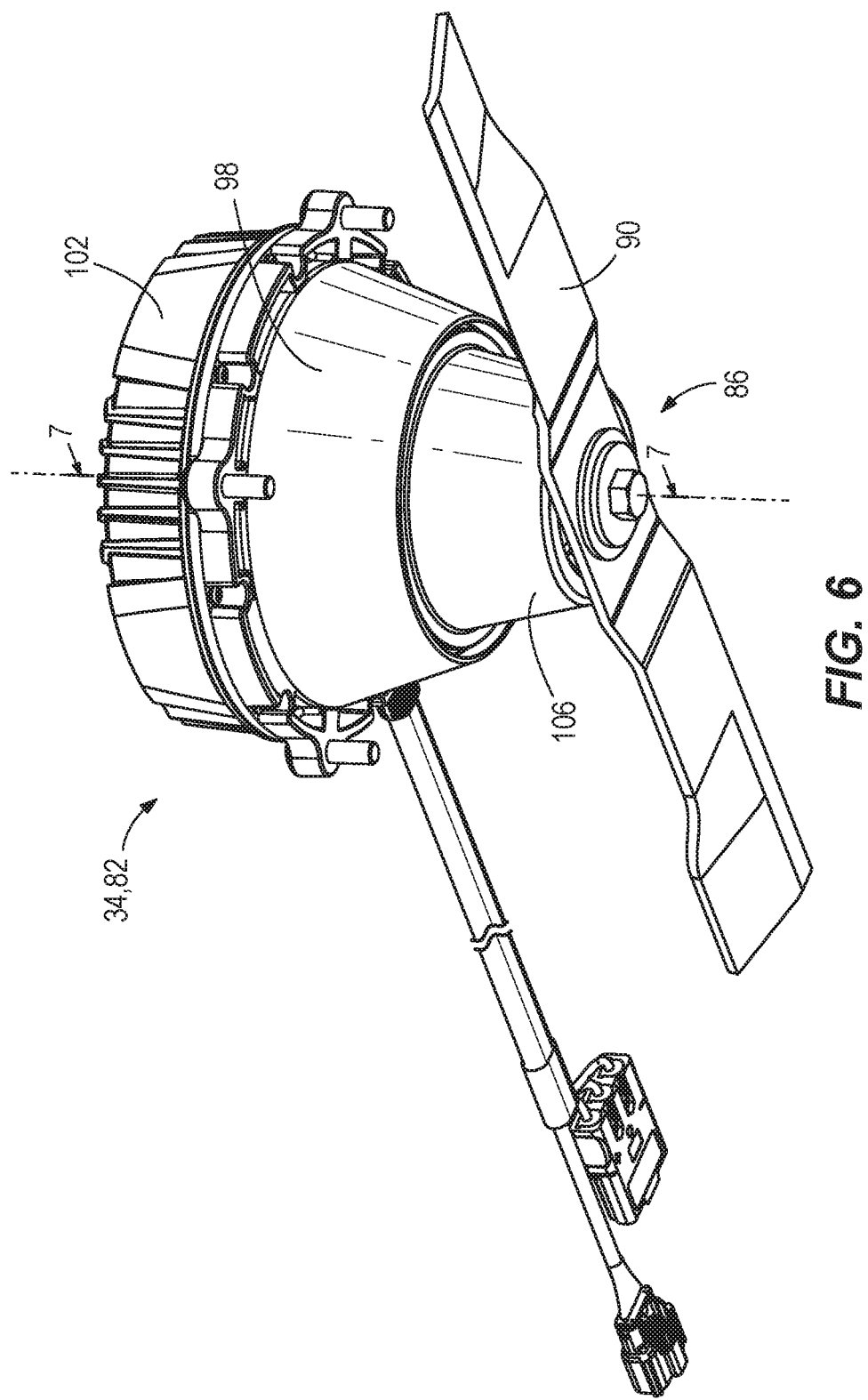
FIG. 6 is a perspective view of a spindle assembly of the lawn mower.

With reference to FIGS. 3 and 5, the cutting deck 30 includes one or more ground-engaging elements 84 (e.g., anti-scalping rollers) that support the cutting deck 30 on the around. A plurality (three in the illustrated embodiment) of deck spindle assemblies 82 are mounted to the cutting deck 30. In the illustrated embodiment, the cutting deck 30 includes three spindle assemblies 82. In other embodiments, the cutting deck 30 may include fewer spindle assemblies 82 (e.g., one or two) or more spindle assemblies 82 (e.g., three, four, etc.). Each spindle assembly 82 includes a blade assembly 86 (FIG. 3) having a blade 90 that is under the cutting deck 30 to cut grass under the cutting deck 30. In some embodiments, the blade assembly 86 may include only the blade 90 and a blade mounting fastening device to secure the blade 90 to the spindle assembly 82. In other embodiments, the blade assembly 86 may include additional components as described below. In the illustrated embodiment, the cutting deck 30 includes a side discharge opening 94 to discharge mown grass. In other embodiments, the mower 10 may include a rear discharge opening, a collection bag, etc. While lawn mower 10 is described above as an electric zero turn lawn mower, it should be appreciated that the spindle assembly 82 and the blade assembly 86 as described below may be used with any utility device that is operable to cut grass. Additionally, it should be appreciated that the blade assembly 86 may be used with other types of cutting deck (e.g., belt drive, etc.).

Figure 7:
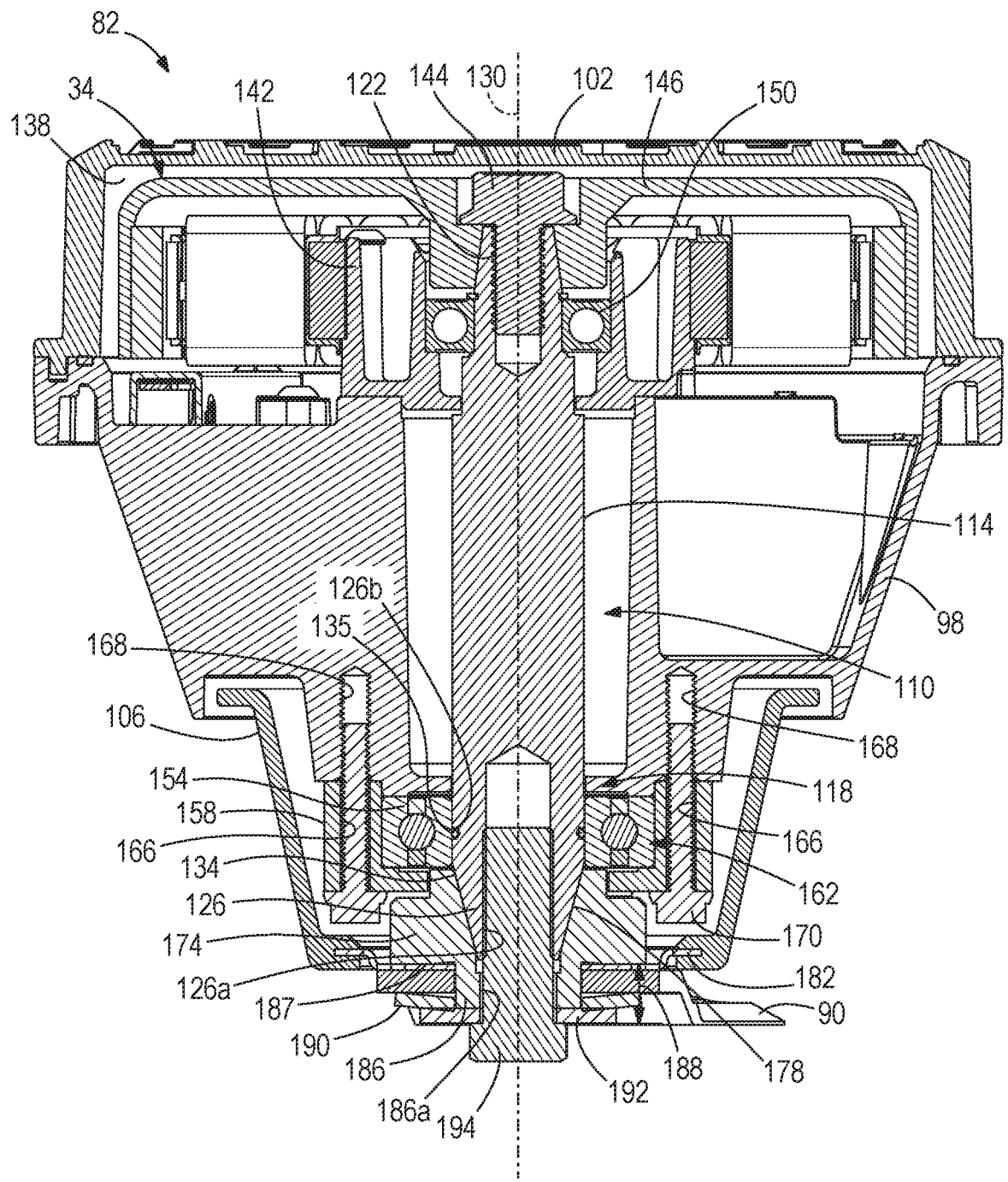
FIG. 7 is a cross-sectional side view of the spindle assembly.
Figure 8:
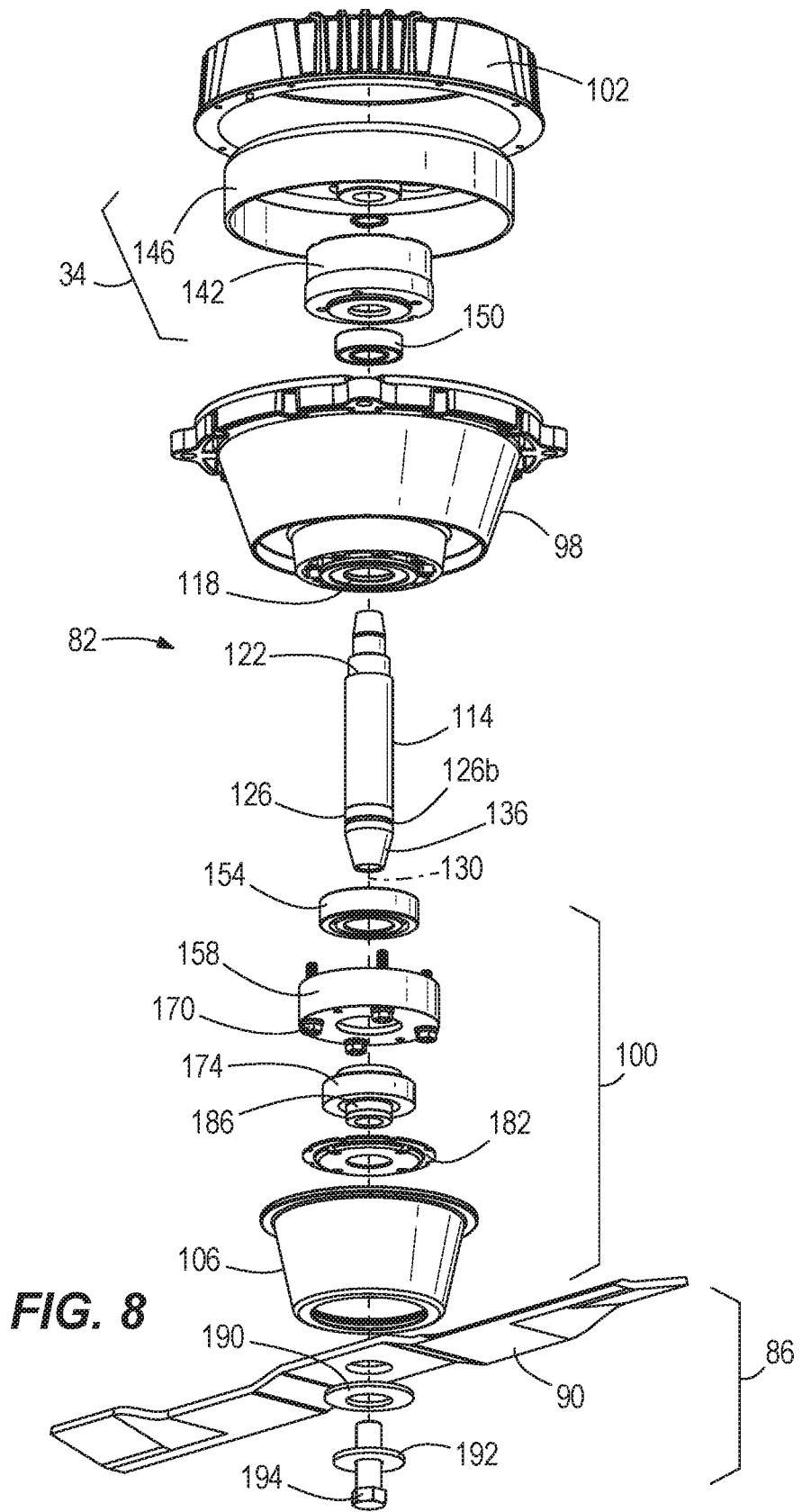
FIG. 8 is an exploded perspective view of the spindle assembly.

FIGS. 6-9 illustrate one of the spindle assemblies 82. The spindle assembly 82 includes a spindle housing 98, an upper housing 102 coupled to an upper portion of the spindle housing 98, a vertical spindle shaft 114, an upper bearing 150, and a lower bearing assembly 100 (FIG. 8). The blade assembly 86 is coupled to the spindle shaft 114. The lower bearing assembly 100 includes a debris guard 106, a lower bearing 154, a lower bearing carrier 158, and lower bearing mounting fasteners 170, and a blade adapter 174.

With reference to FIG. 7, a lower portion of the spindle housing 98 includes a bore 110 and clearance opening 118 through which the vertical spindle shaft 114 extends. The spindle shaft 114 includes an upper spindle shaft portion 122 and a lower spindle shaft portion 126. The upper spindle shaft portion 122 is positioned within the upper housing 102 and the lower spindle shaft portion 126 extends through the clearance opening 118. The spindle shaft 114 defines a spindle shaft axis 130 extending longitudinally and centrally through the spindle shaft 114. In the illustrated embodiment, the lower spindle shaft portion 126 includes a tapered portion 134. In other embodiments, the lower spindle shaft portion 126 may have a uniform diameter. The lower spindle shaft portion 126 includes a downward-opening threaded bore 126*a* and a groove 126*b* for an o-ring 135.

The upper housing 102 forms an internal cavity 138 to house the motor 34 which comprises a stator 142 and a rotor 146. The rotor 146 and stator 142 are coupled in the sense that the rotor 146 is sufficiently close to or proximate the stator 142 so that the rotor 146 rotates with respect to the stator 142 when the stator 142 is energized. For example, the rotor 146 may include a plurality of permanent magnets. The stator 142 includes electromagnets (e.g., electric coils) that form an electromagnetic field when a three-phase current is applied to the electromagnets. As a result, the permanent magnets of the rotor 146 interact with the magnetic field of the stator 142 to cause rotation of the rotor 146 relative the stator 142. In the illustrated embodiment, the rotor 146 is coupled by way of a rotor fastener 144 to the upper spindle shaft portion 122 such that the rotor 146 and spindle shaft 114 rotate together relative to the stator 142. The stator remains stationary within or with respect to the upper housing 102. The stator 142 and rotor 146 are assembled in a precise way (with the upper bearing 150 as will be described below) for operation of the motor 34. As a result, excessive off-axis movement of the spindle shaft 114 relative to the operating position of the spindle shaft axis 130 or an excessive peak torque on the stator 142 or rotor 146 may damage the motor 34 in the sense of misaligning the stator 142 and rotor 146.

The upper bearing 150 is positioned between the upper spindle shaft portion 122 and the stator 142 to support the upper spindle shaft portion 122 in the stator 142 for rotation with respect to the stator 142. A first part of the upper bearing 150 is fixed for rotation with the upper spindle shaft portion 122 and a second part of the upper bearing 150 is fixed with respect to the stator 142. The upper bearing 150 permits relative rotation between the first and second parts about the spindle shaft axis 130.

The lower bearing 154 includes an inner race that supports the lower spindle shaft portion 126. The o-ring 135 creates a seal between the inner race and the lower spindle shaft portion 126. The outer race of the lower bearing 154 is fixed with respect to the lower bearing carrier 158 and the lower bearing carrier 158 is in turn rigidly mounted to the bottom of the spindle housing 98. In the illustrated embodiment, the lower bearing carrier 158 includes a bearing support cavity 162 and a plurality of mounting apertures 166 (through holes) through which the lower bearing mounting fasteners 170 extend. The lower bearing mounting fasteners 170 pass through the mounting apertures 166 and thread into threaded bores 168 in a lower portion of the spindle housing 98. As a result, the lower bearing carrier 158 is fixed with respect to the spindle housing 98 and the outer race of the lower bearing 154 abuts against the bottom of the spindle housing 98. Owing to a shallow recess in the bottom of the spindle housing 98, the inner race of the lower bearing 154 rotates freely (with the spindle shaft 114) with respect to the lower bearing carrier 158 and spindle housing 98.

The lower bearing carrier 158 may be removed from the spindle housing 98 by unthreading the lower bearing mounting fasteners 170 from the threaded bores 168 when the lower bearing 154 needs to be repaired or replaced (collectively "serviced"). In other embodiments, the lower bearing carrier 158 may be mounted to the spindle housing 98 in any fashion that rigidly fixes the lower bearing carrier 158 to the spindle housing 98 but also allows the lower bearing carrier 158 to be removed from the spindle housing 98 for service. In addition, there is a close fit (pilot) between the lower bearing carrier 158 (female) and the spindle housing 98 (male). This provides for a repeatably precise alignment between the lower bearing 154 and the upper bearing 150 on the spindle shaft axis 130 when the lower bearing 154 is serviced.

The blade adapter 174 is coupled to the lower spindle shaft portion 126 adjacent the lower bearing carrier 158. A reduced diameter upper portion of the blade adapter 174 may extend up through the bottom of the lower bearing carrier 158 and abut the bottom of the inner race of the lower bearing 154. In the illustrated embodiment, the blade adapter 174 may include a central aperture 178 having a tapered engaging portion that engages with the tapered portion 134 of the spindle shaft 114. In other embodiments, the central aperture 178 of the blade adapter 174 may be formed to have any geometry that allows the blade adapter 174 to frictionally engage with the lower spindle shaft portion 126 so that the blade adapter 174 and spindle shaft 114 are coupled for rotation together.

The blade adapter 174 includes a reduced-diameter, downward-extending stand-off portion 186 and a downward-facing shoulder 187 radially surrounding the top of the stand-off portion 186 where the stand-off portion 186 meets the main body of the blade adapter 174. The stand-off portion 186 includes a clearance hole 186 *a* aligned with the threaded bore 126 *a* in the lower spindle shaft portion 126. Both the clearance hole 186 *a* and the threaded bore 126 *a* are centered on the spindle shaft axis 130 of the lower spindle shaft portion 126.

The bearing debris guard 106 includes a washer 182 having outer edges embedded within a lower portion of the debris guard 106. The washer 182 includes a central hole through which the stand-off portion 186 extends. The bearing debris guard 106 is frictionally coupled to the blade adapter 174 for rotation therewith, as will be described below, and extends up around the lower bearing 154 and the lower bearing carrier 158 to shield or protect the lower bearing 154 from debris. The bearing debris guard 106 may be formed of a plastic material, a metallic material, etc. The washer 182 may be formed of a metallic material (e.g., steel, aluminum, etc.) with the central exposed portion providing a bearing surface in frictional engagement with the central mounting portion of the blade 90 as will be described below.

The blade assembly 86 includes the blade 90, a biasing member 190 (e.g., a Belleville spring washer), and an engagement washer 192 (e.g., a flat washer), each including a hole centered in the spindle shaft axis 130. A blade mounting fastener 194 extends through the aligned holes in the engagement washer 192, biasing member 190, blade adapter 174 (clearance hole 186 a), and blade 90, and threads into the threaded bore 126 a in the lower spindle shaft portion 126. The free lower end of the stand-off portion 186 extends through the hole in the biasing member 190 and abuts the engagement washer 192.

The blade mounting fastener 194 traps the blade assembly 86 and washer 182 of the bearing guard 106 against the shoulder 187 of the blade adapter 174 with an axial force. A blade mounting gap 188 is defined between the shoulder 187 and the head of the blade mounting fastener 194. The washer 182 of the bearing debris guard 106, the blade 90, the biasing member 190, and the engagement washer 192 are captured in the blade mounting gap 188. The axial force of the blade mounting fastener 194 narrows or closes the blade mounting gap 188 by pulling the lower spindle shaft portion 126 and engagement washer 192 toward each other as the blade mounting fastener 194 advances into the threaded bore 126 a.

The blade mounting gap 188 narrows or closes until the lower spindle shaft portion 126 is tightly pressed into the tapered portion of the central aperture 178 of the blade adapter 174 and the stand-off portion 186 is brought into tight abutting engagement with the engagement washer 192 and head of the blade mounting fastener 194. As the blade mounting gap 188 narrows, the biasing member 190 is deflected, which increases friction (due to the resulting normal force of the biasing member 190) between all elements captured in and defining the gap 188 (i.e., the blade adapter 174, the washer 182 of the debris guard 106, the blade 90, the biasing member 190, the engagement washer 192, and the blade mounting fastener 194). Thus, the spindle shaft 114, blade adapter 174, debris guard 106, blade 90, biasing member 190, engagement washer 192, and blade mounting fastener 194 are frictionally coupled for rotation together as a result of the biasing force arising in the biasing member 190 as the blade mounting gap 188 is narrowed or closed.

The blade assembly is not limited to the components and construction illustrated and described. Fundamentally, what is required is a first bearing surface (e.g., the blade adapter 174, debris guard 106, washer 182, or any other surface that engages one side of the blade 90 and is coupled for rotation with the spindle shaft 114), a gap setting component (e.g., the stand-off portion 186 or other component), and a second bearing surface (e.g., the biasing member 190 or another component that engages an opposite side of the blade 90). The first and second bearing surfaces frictionally engage the opposite sides of the blade 90. The gap setting component dictates the blade mounting gap 188 when the assembly is tightened and prevents the blade mounting fastener 194 from narrowing the gap beyond a preferred gap size. The biasing member 190 has an at-rest or undeflected thickness or height and is deflected to a reduced height in response to the blade mounting gap 188 being narrowed to the preferred gap size. In response to being deflected, the biasing member 190 generates a normal force or other force which can be referred to as a blade coupling force. The blade coupling force gives rise to friction, which can be called a blade coupling friction, between the blade and at least the first bearing surface to frictionally couple the blade and the spindle for rotation together.

When the blade impact event occurs (e.g., the blade 90 strikes a rock, a stake, etc), force resisting rotation of the blade 90 is received by the blade 90. If the force resisting rotation of the blade 90 overcomes the blade coupling friction, the blade 90 slips with respect to the spindle shaft 114. For example, the blade 90 may slip with respect to the first bearing surface and the second bearing surface, while the spindle shaft 114 and the blade adapter 174 continue to rotate. Other components in the gap may rotate with the spindle shaft 114 and blade adapter 174 or may stop rotating along with the blade 90. The biasing member 190 and blade 90 absorb a large amount of the impact torque from the blade impact event, and the impact torque received by the spindle shaft 114 and the sensitive electrical components of the deck motor 34 (e.g., the stator 142 and the rotor 146) is limited.

During operation of the lawn mower, the lower bearing 154 is typically the first component of the deck motor 34 to wear out. As a result, the construction of the deck motor 34 allows the lower bearing 154, the debris guard 106, the blade adapter 174, and the blade assembly 86 to be removed from the spindle assembly 82 and deck motor 34 to service the lower bearing 154. Such servicing can be accomplished in the field or in a shop without having to disassemble the enter spindle assembly 82 and specifically without having to disengage the spindle shaft 114 from the motor 34.

Figure 9A:
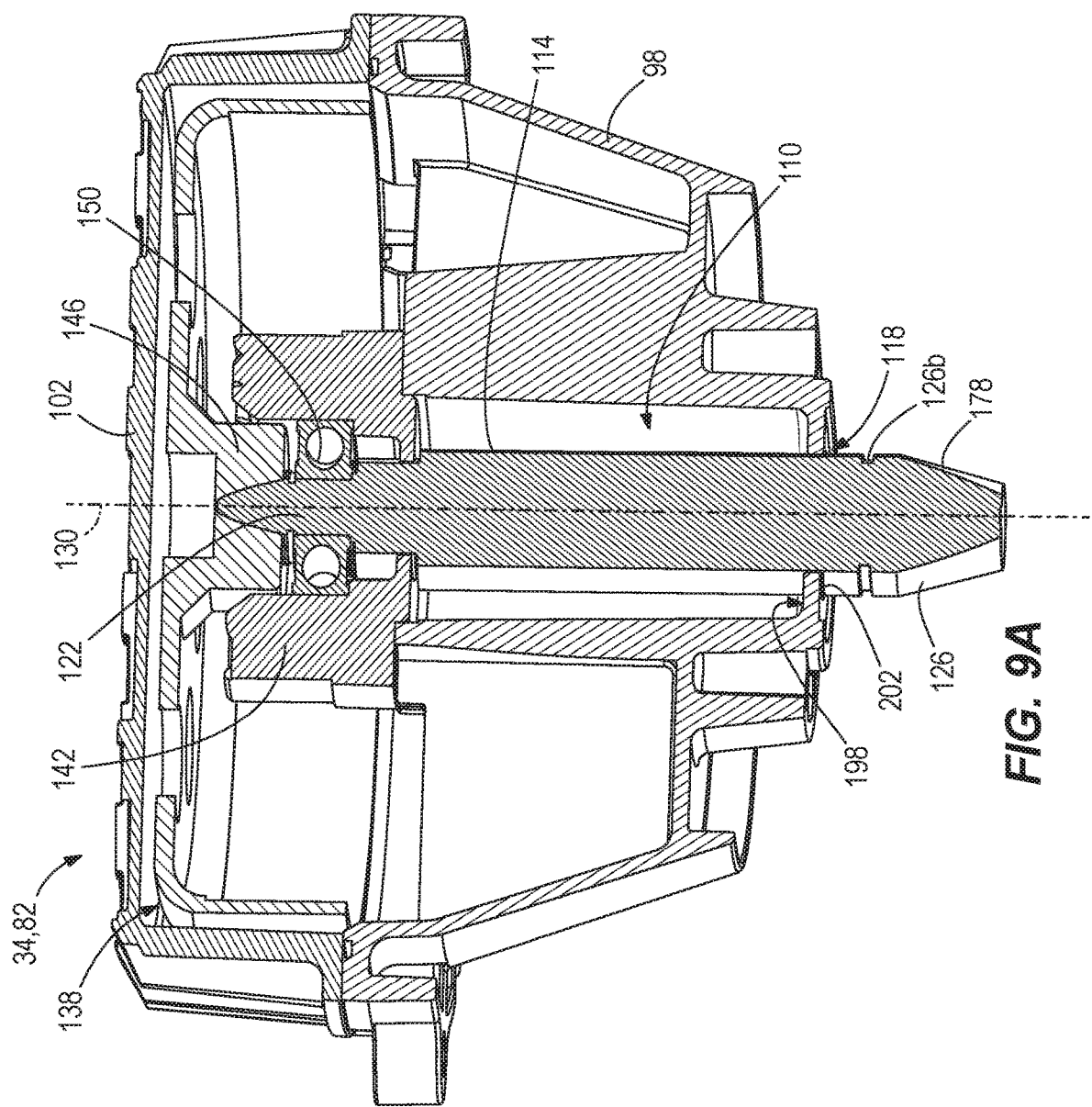
FIG. 9A is a cross-sectional side view of the spindle assembly with a blade assembly, a bearing debris guard, a lower bearing carrier, and a lower bearing removed.
Figure 9B:
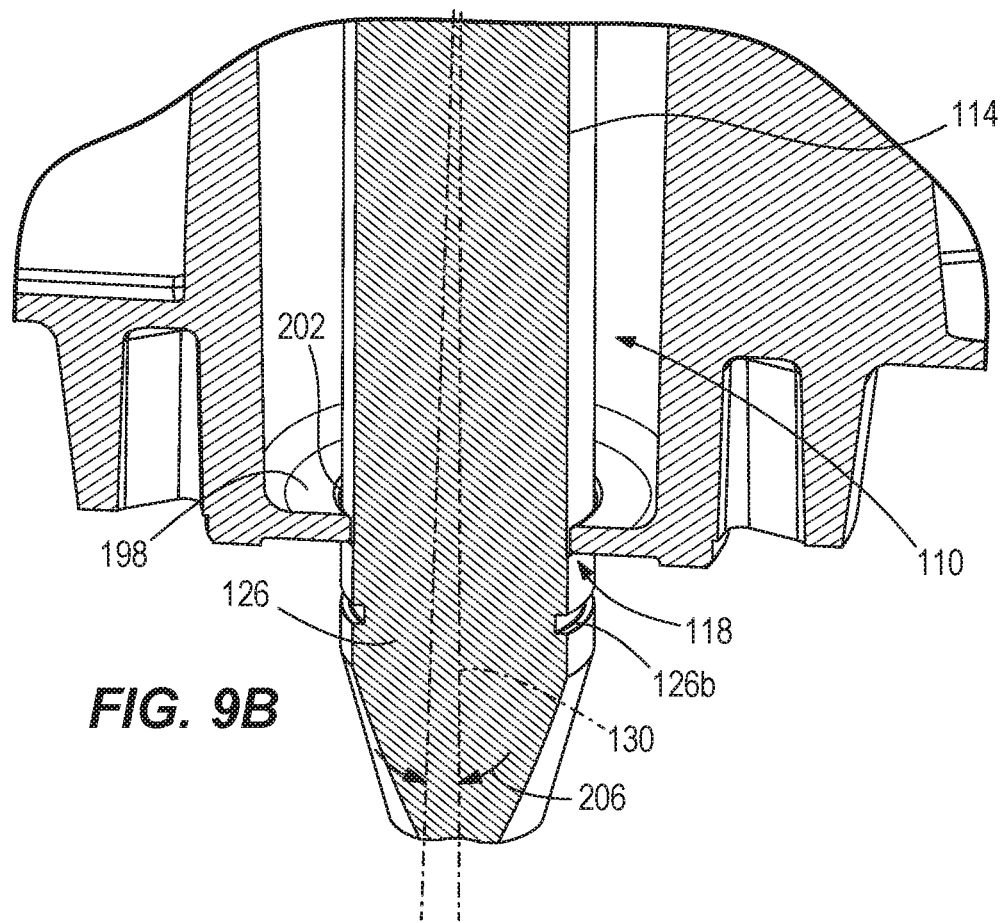
FIG. 9B is an isolated cross-sectional side view illustrating a spindle shaft of the spindle assembly extending through a bore within a spindle housing of the spindle assembly.
Figure 9C:
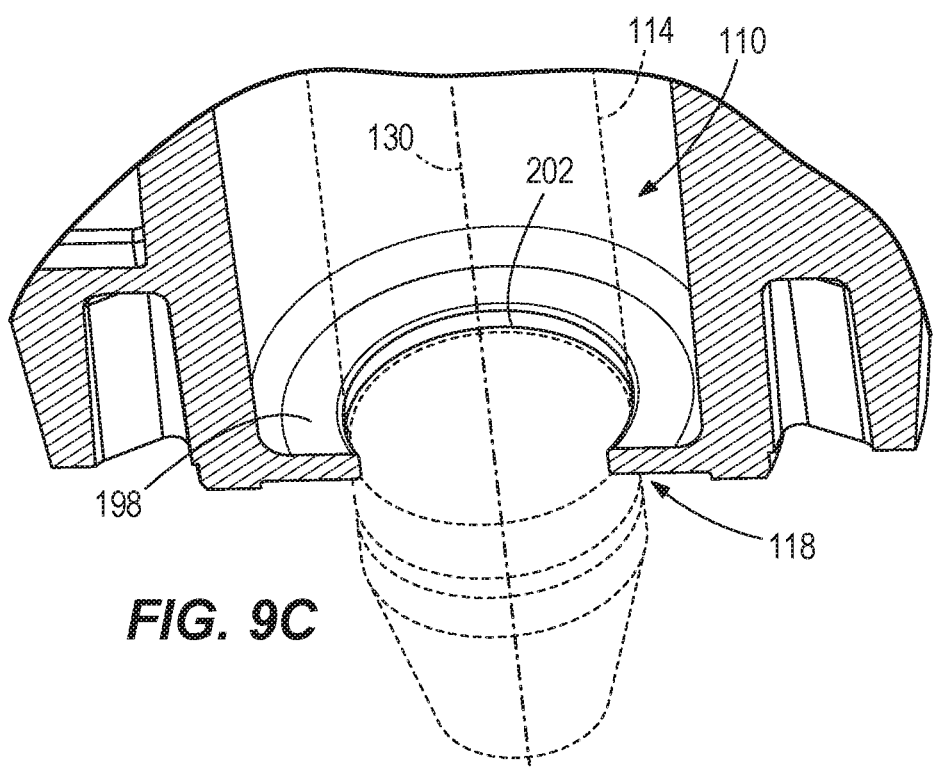
FIG. 9C is the isolated cross-sectional side view of FIG. 9B with the spindle shaft transparently illustrated.

With reference to FIG. 9A-C, the clearance opening 118 defines a radial shaft alignment structure 198 in the bottom end of the spindle housing 98. An annular clearance gap 202 is defined between the spindle shaft 114 and the clearance opening 118. In the illustrated embodiment, the clearance gap 202 is in a range from ten-thousandths of an inch to twenty-thousandths of an inch. In other embodiments, the clearance gap 202 may be greater than twenty-thousandths of an inch or less than ten thousandths of an inch.

The bore 110, clearance opening 118, and spindle shaft 114 are precisely formed so that when the lower bearing 154 is supporting the spindle shaft 114 the clearance gap 202 is consistently maintained around the spindle shaft 114 and the spindle shaft 114 does not contact the shaft alignment structure 198. Ideally, the spindle shaft 114 is centered in the clearance opening 118 and both the spindle shaft 114 and clearance opening 118 are perfectly circular such that the clearance gap 202 is a consistent annular space between the spindle shaft 114 and clearance opening 118. It is recognized that nothing is perfect but with advanced machining processes, high tolerances can be achieved. As such, during operation of the motor 34 and spindle assembly 82, when the spindle shaft 114 is spinning about the spindle shaft axis 130, the spindle shaft 114 does not contact the bottom wall of the spindle housing 98 in which the clearance opening 118 is formed (i.e., the shaft alignment structure 198).

When servicing the lower bearing 154, the lower bearing 154 is removed which permits the spindle shaft 114 to tip or pivot within the spindle housing 98 about a point in the upper spindle portion 122 that is supported in the upper bearing 150. As the spindle shaft 114 tips in this fashion, the lower spindle shaft portion 126 may contact the shaft alignment structure 198. In an ideal construction, the extent to which the spindle shaft 114 is permitted to tip in any direction when not supported by the lower bearing 154 is the width of the clearance gap 202.

As illustrated in FIG. 9B, the shaft alignment structure 198 constrains or prevents the spindle shaft 114 from tipping more than a predetermined angle 206 relative to the operating orientation (e.g., vertical) of the spindle shaft axis 130. Although radial movement (i.e., purely perpendicular to the ideal operating position of spindle shaft axis 130) of the spindle shaft 114 is unlikely due to the upper bearing 150 and lower bearing 154, such radial movement is also constrained by the shaft alignment structure 198. In the illustrated embodiment, the spindle shaft 114 is restricted from pivoting more than approximately 0.25-0.30 degrees and from moving radially more than approximately twenty-thousandths of an inch. To maintain desired tolerances, the diameter of the clearance opening 118 should be selected based on factors such as the diameter of the spindle shaft 114 and distance between the upper bearing 150 and the clearance opening 118.

Removal of the lower bearing assembly 100 (debris guard 106, lower bearing 154, lower bearing carrier 158, lower bearing mounting fasteners 170, and blade adapter 174) for service will now be discussed. First the blade mounting fastener 194 is uncoupled (i.e., unthreaded) from the lower spindle shaft portion 126 so that the blade adapter 174, bearing debris guard 106, and blade assembly 86 can be removed from the lower spindle shaft portion 126. Then the lower bearing mounting fasteners 170 are unthreaded from the spindle housing 98 so that the lower bearing 154 and lower bearing carrier 158 can also be removed from the spindle housing 98. This leaves the lower spindle shaft portion 126 exposed through the bottom of the spindle housing 98 and free-hanging or unsupported in the clearance opening 118. The motion of the spindle shaft 114 is restricted or constrained as noted above by the shaft alignment structure 198. A replacement, rebuilt, or repaired lower bearing 154 (collectively, a "replacement lower bearing 154") is inserted into the lower bearing carrier 158. The lower bearing carrier 158 is mounted to the spindle housing 98 with the lower bearing mounting fasteners 170, so the replacement lower bearing 154 supports the lower spindle shaft portion 126. Then the blade adapter 174, debris guard 106, and blade assembly 86 are positioned on the lower spindle shaft portion 126. Last, the blade mounting fastener 194 is threaded into the threaded bore 126 a in the lower spindle shaft portion 126 and tightened until the lower spindle shaft portion 126 is tightly pressed into the tapered portion of the central aperture 178 of the blade adapter 174 and the stand-off portion 186 is brought into tight abutting engagement with the engagement washer 192 and head of the blade mounting fastener 194.

Thus, the invention is to cover all modifications, equivalents, and alternatives falling within the spirit and scope of the invention as defined by the following claims.

What is claimed is:

1. An electric motor for a lawn mower comprising:
a spindle housing having a bore with a spindle clearance opening;
an upper housing coupled to an upper portion of the spindle housing;
a stator positioned within the upper housing;
a spindle shaft extending vertically through the bore of the spindle housing, the spindle shaft having an upper spindle shaft portion and a lower spindle shaft portion;
a rotor coupled to the stator within the upper housing and coupled to the spindle shaft for rotation of the spindle shaft;
an upper bearing supporting the upper spindle shaft portion in the rotor;
a lower bearing supporting the lower spindle shaft portion;
a lower bearing carrier mounted to the spindle housing and supporting the lower bearing proximate to the spindle clearance opening;
a blade adapter coupled for co-rotation with the lower spindle shaft portion;
a bearing debris guard coupled for co-rotation with the spindle shaft, the bearing debris guard positioned around the lower bearing, the lower bearing carrier, and a portion of the blade adapter to protect the lower bearing from debris; and
a blade coupled to the blade adapter with a blade mounting fastener.

2. The electric motor of claim 1, further comprising a washer having outer edges embedded within a lower portion of the debris guard.

3. The electric motor of claim 2, wherein the washer is formed of a metallic material with the central exposed portion providing a bearing surface in frictional engagement the blade.

4. The electric motor of claim 1, wherein a bearing surface is formed by the debris guard or the blade adapter, wherein the blade is configured to slip relative to the spindle shaft and the bearing surface when a blade impact event occurs.

5. The electric motor of claim 4, wherein the blade adapter includes a stand-off portion that extends through the bearing debris guard, wherein a gap extends between the mounting fastener and the bearing surface.

6. The electric motor of claim 5, further comprising a biasing member positioned in the gap and deflected by the blade mounting fastener when the gap is narrowed, wherein the biasing member generates a blade coupling force on the blade.

7. The electric motor of claim 6, wherein the blade coupling force generates a blade coupling friction between the blade and the bearing surface to frictionally couple the blade and the spindle shaft for rotation together.

8. The electric motor of claim 7, wherein the blade slips with respect to the spindle shaft in response to the blade encountering a force resisting rotation of the blade to an extent that overcomes the blade coupling friction.

9. A method of assembling and servicing an electric motor having a spindle housing defining a bore with a spindle clearance opening and an upper housing coupled to an upper portion of the spindle housing, the method comprising:
positioning a stator in the upper housing;
coupling a rotor to the stator within the upper housing;
positioning a spindle shaft within the bore, the spindle shaft extending vertically through the bore of the spindle housing, the spindle shaft having an upper spindle shaft portion and a lower spindle shaft portion;
supporting the upper spindle shaft portion in the stator with an upper bearing;
supporting the lower spindle shaft portion with a lower bearing;
supporting the lower bearing proximate to the spindle clearance opening with a lower bearing carrier mounted to the spindle housing;
coupling a blade adapter to the lower spindle shaft portion for co-rotation therewith;
coupling a bearing debris guard to the spindle shaft for co-rotation therewith, the bearing debris guard positioned around the lower bearing, the lower bearing carrier, and a portion of the blade adapter to protect the lower bearing from debris; and coupling a blade to the blade adapter with a blade mounting fastener.

10. The method of claim 9, further comprising restricting the motion of the spindle shaft with the spindle clearance opening when the lower bearing, the lower bearing carrier, the blade adapter, the bearing debris guard, and the blade are removed from the electric motor.

11. The method of claim 9, further comprising replacing the lower bearing with a replacement lower bearing and coupling the replacement lower bearing, the lower bearing carrier, the blade adapter, the bearing debris guard, and the blade to the electric motor.

12. The method of claim 9, further comprising uncoupling the blade mounting fastener to remove the blade from the blade adapter.

13. The method of claim 12, further comprising uncoupling the bearing debris guard from the spindle housing to allow access to the lower bearing, the lower bearing carrier, and the blade adapter.

14. The method of claim 13, further comprising uncoupling the blade adapter from the lower spindle shaft portion.

15. The method of claim 14, further comprising unmounting the lower bearing carrier from the spindle housing to remove the lower bearing carrier and the lower bearing from the electric motor.

16. The method of claim 15, further comprising restricting the motion of the spindle shaft with the spindle clearance opening.

17. The method of claim 16, further comprising providing a replacement lower bearing in the lower bearing carrier.

18. The method of claim 17, further comprising
mounting the lower bearing carrier to the spindle housing so the replacement lower bearing supports the lower spindle shaft portion,
coupling the blade adapter, debris guard, and the blade to the electric motor.

19. An electric motor for a lawn mower comprising:
a spindle housing having a bore with a spindle clearance opening;
an upper housing coupled to an upper portion of the spindle housing; a stator positioned within the upper housing;
a spindle shaft extending vertically through the bore of the spindle housing, the spindle shaft having an upper spindle shaft portion and a lower spindle shaft portion;
a rotor coupled to the stator within the upper housing and coupled to the spindle shaft for rotation of the spindle shaft;
an upper bearing supporting the upper spindle shaft portion in the rotor; a lower bearing supporting the lower spindle shaft portion;
a lower bearing carrier mounted to the spindle housing and supporting the lower bearing proximate to the spindle clearance opening;
a blade adapter coupled to the lower spindle shaft portion;
a bearing debris guard coupled to the spindle housing around the lower bearing, the lower bearing carrier, and a portion of the blade adapter to protect the lower bearing from debris; and
a blade coupled to the blade adapter with a blade mounting fastener,
wherein the blade, the bearing debris guard, the blade adapter, the lower bearing carrier and the lower bearing are removable from the electric motor,
wherein the spindle clearance opening limits the radial movement of the lower portion of the spindle shaft when the blade, the bearing debris guard, the blade adapter, the lower bearing carrier and the lower bearing are removed from the electric motor.

20. An assembly for mounting a blade to a spindle shaft, the assembly comprising:
a first bearing surface on one side of the blade and frictionally engaging the blade, the first bearing surface rigidly coupled for rotation with the spindle shaft;
a second bearing surface on an opposite side of the blade;
a biasing mechanism in a gap between the second bearing surface and the blade;
a fastener operable to narrow the gap and deflect the biasing mechanism; and
a gap setting component extending through the biasing mechanism to prevent the fastener from narrowing the gap beyond a preferred gap size;
wherein the biasing mechanism surrounds the gap setting component and generates a blade coupling force in response to the gap achieving the preferred gap size;
wherein the blade coupling force generates a blade coupling friction between the blade and the first bearing surface to frictionally couple the blade and the spindle shaft for rotation together; and
wherein the blade slips with respect to the spindle shaft in response to the blade encountering a force resisting rotation of the blade to an extent that overcomes the blade coupling friction.

21. The blade assembly of claim 20, wherein the gap setting component comprises a standoff portion extending from the first bearing surface.

* * * * *